United States Patent [19]
Gedeon

[11] 4,025,080
[45] May 24, 1977

[54] MOVABLE FUEL TANK MOUNT

[75] Inventor: Nelson J. Gedeon, Aurora, Ohio

[73] Assignee: Towmotor Corporation, Mentor, Ohio

[22] Filed: Jan. 19, 1976

[21] Appl. No.: 650,223

[52] U.S. Cl. ............................ 280/5 A; 214/450; 224/42.44
[51] Int. Cl.² ......................................... B60P 3/22
[58] Field of Search ............... 280/5 A, 5 R, 756; 224/42.44, 42.38; 214/454, 450; 180/68.5; 292/264

[56] References Cited

UNITED STATES PATENTS

| 1,577,588 | 3/1926 | Phillips | 280/5 A |
| 2,726,112 | 12/1955 | Conhagen | 292/264 |
| 2,833,365 | 5/1958 | Kesl et al. | 280/5 A |
| 2,895,560 | 7/1959 | Lynn | 280/5 A |
| 3,790,183 | 2/1974 | Price | 280/5 A |

Primary Examiner—Joseph F. Peters, Jr.
Assistant Examiner—John A. Pekar
Attorney, Agent, or Firm—Charles E. Lanchantin, Jr.

[57] ABSTRACT

A movable fuel tank mount is disclosed for a vehicle having a frame member, a component needing periodic servicing, and an external fuel tank. The mount includes a cradle assembly for supporting the fuel tank, and an assembly which is secured to the frame member for supporting the cradle assembly and enabling it and the fuel tank to be moved from a normal position blocking access to the component and to a service position allowing convenient access thereto.

3 Claims, 5 Drawing Figures

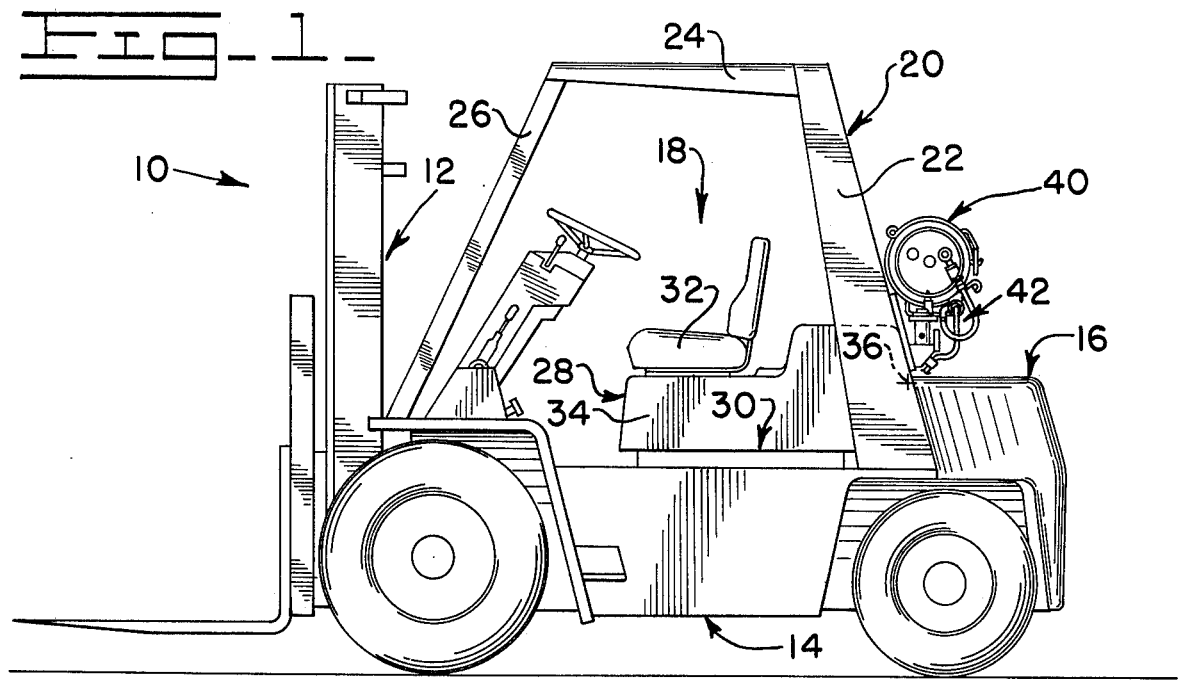
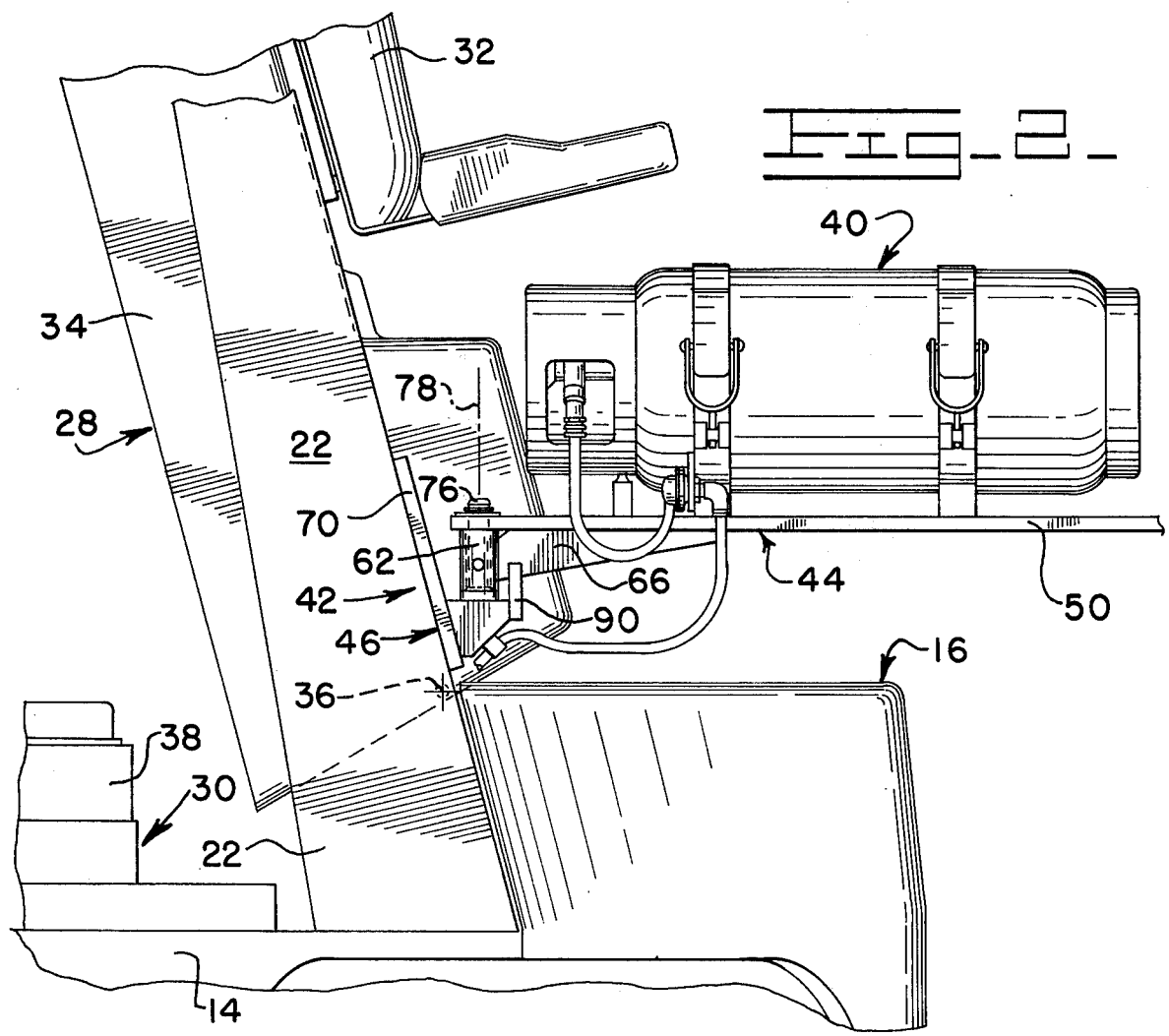

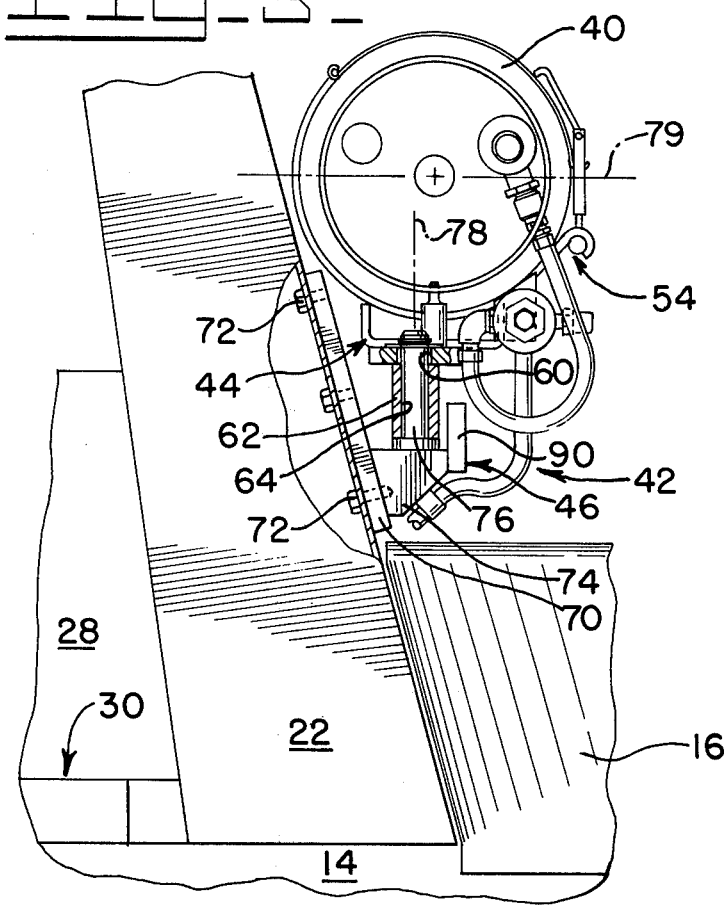
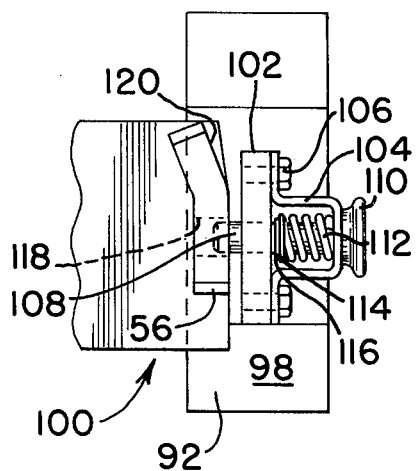
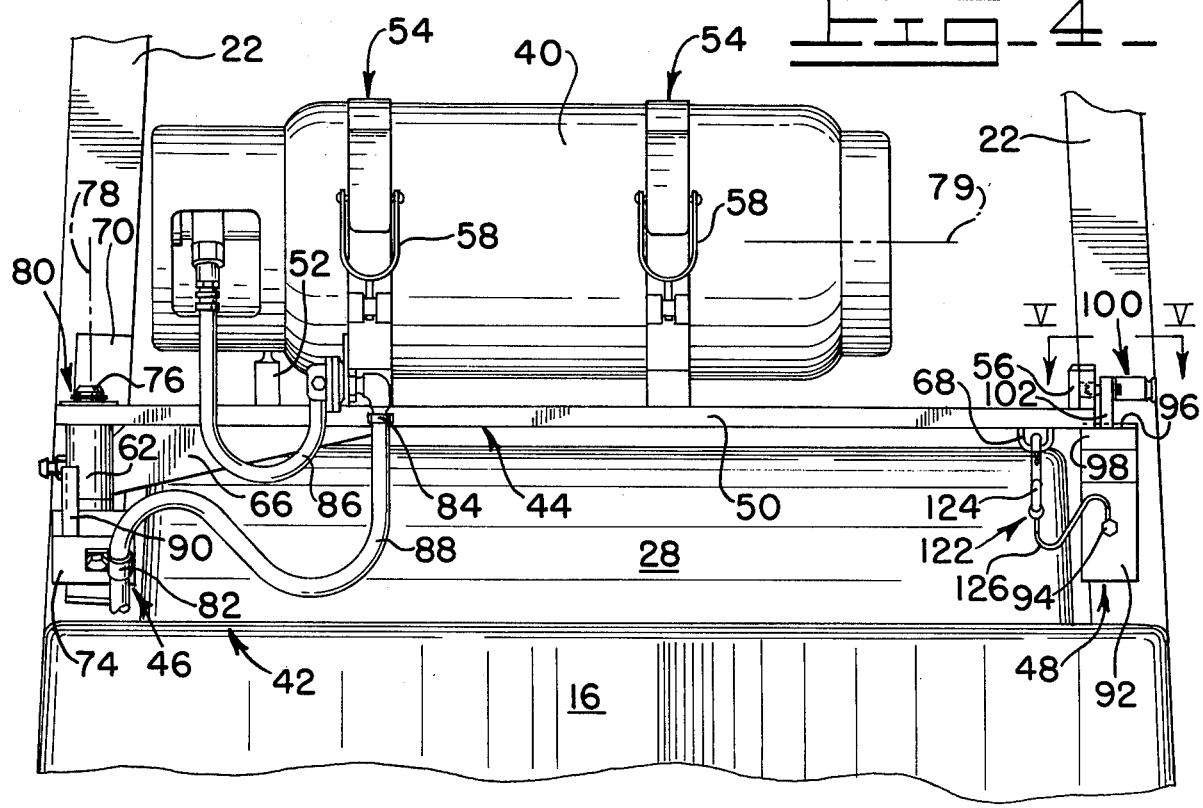

MOVABLE FUEL TANK MOUNT

BACKGROUND OF THE INVENTION

Industrial vechicles such as fork lift trucks and the like have been widely adopted because of their responsive performance in a variety of jobs. These lift trucks are offered with differently fueled power plants because of ecological reasons associated with the use of the lift trucks in restricted, indoor applications or because of economical factors. For example, these machines are being offered in gas, liquified petroleum (L.P.) gas and diesel fuel powered versions, or in easily convertible combinations thereof. In each instance, it is necessary to allow convenient access to many of the operating components within the compact confines of the lift truck for servicing purposes.

More particularly, many lift trucks have centrally disposed compartments with swing-up hoods to expose various engine and transmission components for daily maintenance. But such swinging hoods or covers require freedom in which to pivot, so that this imposes restrictions on the placement of an external fuel tank on the upper surfaces of the lift truck body. In the past, cylindrical L.P. gas tanks have been mounted in a horizontal manner on the top of the removable rear counterweight. Unfortunately, in this general location, the fuel tank interferes with the upward swinging movement of the compartment hood and the quick removal of the counterweight as is frequently necessary when loading the lift truck aboard a ship.

In addition, in order to meet certain safety requirements and to obtain Underwriter Laboratory Approval these fuel tanks must be mounted in a predetermined manner. For example, the fuel tank should not protrude outwardly beyond the sides of the lift truck where it might be damaged.

SUMMARY AND OBJECTS OF THE INVENTION

Accordingly, it is an object of the present invention to provide a vehicular fuel tank mount which is movable to allow convenient service access to a component otherwise blocked thereby.

Another object of the present invention is to provide such an improved fuel tank mount which is safe and rugged in its construction.

Another object of the invention is to provide a fuel tank mount of the character described which may be effectively latched in place in a normal position, but which may be easily released from the latched condition for movement to a service position.

Other objects and advantages of the present invention will become more readily apparent upon reference to the accompanying drawings and the following description.

BRIEF DESCRIPTION OF THE DRAWINGS

FIG. 1 is a side elevational view of a lift truck incorporating the movable fuel tank mount of the present invention thereon.

FIG. 2 is an enlarged fragmentary side elevational view of the lift truck shown in FIG. 1 with the fuel tank mount of the present invention illustrated in an open service position to allow a seat and hood assembly to be pivotally raised as shown for convenient access to components to be serviced.

FIG. 3 is an enlarged fragmentary side elevational view of the fuel tank mount shown in FIG. 1 with certain portions broken open to better illustrate details of construction thereof.

FIG. 4 is an enlarged fragmentary rear elevational view of the fuel tank mount of FIG. 1.

FIG. 5 is a greatly enlarged fragmentary top plan view of the fuel tank mount as taken along the line V-V of FIG. 4 and showing details of a latch mechanism which is used therewith.

DESCRIPTION OF THE PREFERRED EMBODIMENT

Referring now to FIG. 1, a vehicle, such as an industrial lift truck 10, has a front mounted elevationally displaceable work implement 12, a frame or chassis 14 on which the implement is mounted, and a rear counterweight 16 removably secured to the frame to counterbalance loads carried by the implement. An operator's station 18 centrally overlies the frame, and an overhead guard 20 including a sturdy pair of upwardly converging rear legs or upstanding frame members 22, a roof 24 and a slender pair of front legs 26 protects the operator from falling objects.

A combination seat and hood assembly 28 is disposed in the operator station 18 in a generally overlying manner to a compartment 30 defined generally within the frame 14. The assembly, including a cushioned seat 32 which is secured to the front of a stepped hood or cover 34, is pivotally secured to the rear legs 22 which straddle the compartment for upward and rearward swinging movement about a transverse horizontal pivot axis 36 may be visualized best with reference to FIG. 2. When in its upward service position, convenient access to a serviceable component 38 is assured.

In accordance with the present invention, a substantially cylindrical liquified petroleum (L.P.) gas or fuel tank 40 is supported by a movable fuel tank mount 42 rearwardly of the operator station 18 and above the counterweight 16. The mount is pivotally secured to one of the rear legs 22 of the overhead guard 20 to permit unrestricted upward swinging movement of the seat and hood assembly 28. Basically, and as best shown in FIGS. 3 and 4, the fuel tank mount includes a substantially horizontally disposed cradle assembly 44, a pivot and support assembly 46 secured to the left leg, and a latching mechanism and support assembly 48 secured to the right leg.

More specifically, the cradle assembly 44 includes an elongated flat platform 50 on which are disposed in a laterally spaced and upstanding manner, a guide pin 52, a pair of strap and toggle retainer assemblies 54, and an inclined locking plate 56. The fuel tank 40 is laterally located by the guide pin and clamped in place by the retainer assemblies, and is conveniently released therefrom by pivoting the easily grasped handles 58 from their latched positions shown and outwardly out of their over-center tension-applying positions. As illustrated best in FIG. 3, the platform has an opening 60 therethrough at one end thereof, and a pivot bearing or bushing member 62 having a cylindrical opening 64 therethrough is secured to the bottom of the platform so that the openings are aligned. A gusset 66 is welded or otherwise secured to the pivot bearing and the bottom of the platform to rigidly hold the bearing in an upright position, and a U-shaped bracket 68 is also secured to the bottom of the platform at the other end thereof.

Referring again to FIG. 3, the pivot and support assembly 46 includes a mounting plate 70 which is removably secured to the left rear guard leg 22 by a plurality of bolts 72 screw threadably received in the mounting plate. A rearwardly extending block 74 is secured to the plate and a stepped cylindrical pivot pin 76 extends upwardly therefrom to provide a substantially vertically oriented pivot axis 78 thereat. In this way the pivot bearing 62 of the cradle assembly 44 is adapted to be pivotally received on the pivot pin for free swinging movement of the fuel tank in a generally horizontal plane 79.

A washer and retainer ring, indicated generally by the reference numeral 80, serve to positively limit upward vertical movement of the cradle assembly 44 on the pivot pin 76 after it has been mounted thereon. Moreover, a hose clip 82 is secured to the stationary block 74 of the support assembly 46, and another hose clip 84 is secured to the movable cradle assembly so that with swinging movement thereof a serially connected pair of flexible fuel lines 86 and 88 are maintained by the clips in a favorable untangled and unstressed gently looping condition. To assure that the fuel lines leading from the fuel tank 40 do not become over extended, and in order to limit the maximum swinging movement of the cradle assembly, a stop member 90 is secured in an upright manner to the block 74.

On the opposite end, or to the right side when viewing FIG. 4, the latching and support assembly 48 includes a block 92 which is screw threadably secured to the right leg 22 by one or more bolts 94. The block has a top surface 96, an inclined ramp 98 which rearwardly descends therefrom, and a latch mechanism 100 including a support block 102 which is secured to the top surface thereof.

Referring now to the enlargement of FIG. 5, the latch mechanism 100 further includes a retainer 104 which is secured to the support block 102 by a pair of capscrews 106, and a cylindrical plunger 108 having a knob 110 at its outer end which extends freely through the retainer and the support block. A coiled compression spring 112 is mounted on the plunger and seated against the retainer at its outer end, and is seated against a washer 114 at its inner end which is retained in place on the plunger by a snap ring 116. In this way the plunger is biased inwardly, or to the left when viewing the drawing, into an aperture 118 in the locking plate 56. Moreover, as is clearly apparent, the locking plate has an inclined entry ramp 120 to aid in the closing locking action of the plunger 108.

In order to prevent unlimited free swinging movement of the cradle assembly 44 and the fuel tank 40 in the event that the latch mechanism 100 is disengaged, safety device 122 may be utilized as best shown in FIG. 4. Such device includes a releasable hook 124 and a flexible connector 126 such as a cable or the like which is secured to the block 92, as at one of the bolts 94, and is also secured to the hook. Thus, the hook may be releasably secured to the bracket 68 of the cradle assembly to restrict free swinging movement thereof to a relatively limited range from the support assembly 48.

Operation

While the operation of the present invention is believed clearly apparent from the foregoing description, further amplification will subsequently be made in the following brief summary of such operation. As shown in FIGS. 3 and 4, the movable fuel tank mount 42 of the present invention is illustrated in its normal transverse position blocking access to the compartment 30. In such position the cradle assembly 44 and the fuel tank 40 is disposed in straddling relation towards the rear of the compartment by both of the support assemblies 46 and 48, and it is not possible to fully pivotally elevate the seat and hood assembly 28. It is noted that the right end of the platform 50 is fully supported on the top surface 96 of the block 92, and it is retained positively in place by the interlocking engagement of the plunger 108 within the locking plate 56 as illustrated in FIG. 5.

When it is desired to service the vehicle, however, the latching mechanism 100 is disengaged by grasping the knob 110 and pulling it outwardly against the action of the spring 112, whereupon the plunger is withdrawn from the aperture 118 and the cradle assembly may be freely swung about the axis 78 so that the right end thereof travels rearwardly away from the latch mechanism.

Should the lift truck 10 be parked on an incline the weight of the fuel tank 40 and the cradle assembly 44 may be sufficient to cause excessively fast free swinging movement thereof upon releasing the latching mechanism 100. Consequently, the safety device 122 serves to limit such opening swinging movement until the hook 124 is released from the cradle bracket 68. Of course, the safety device is also useful in this same respect in the event of a complete service failure of the latching mechanism.

Upon disconnecting both the latching mechanism 100 and the safety device 122, the cradle assembly 44 and the fuel tank 40 may be swung rearwardly and outwardly toward the left side of the lift truck 10 as shown best in FIG. 2. In this service position the platform 50 and the fuel tank are longitudinally oriented and the gusset 66 is engaged abuttingly against the stop 90. The fuel tank and cradle assembly are thus clearly out of the way so that the seat and hood assembly 28 may be raised about the transverse pivot axis 36 as shown. Subsequently, the operator or mechanic has free access to the compartment 30 and the component 38 for periodic check or maintenance purposes.

After servicing has been completed and the seat and hood assembly has been lowered back into its normally closed and locked position, it is a simple matter to swing the cradle assembly 44 back toward supporting engagement with the block 92. As it nears the block, the lower surface of the platform 50 travels upwardly on the inclined ramp 98 until it rests on the surface 96. Simultaneously therewith, the extended plunger 108 of the latching mechanism 100 makes contact with the inclined entry ramp 120 on the platform and is depressed and guided into snapping interengagement with the aperture 118.

In view of the foregoing, it is readily apparent that the structure of the present invention provides an improved fuel tank mount capable of allowing a fuel tank to be swung from a normally closed position blocking access to a serviceable component to an open position allowing convenient access thereto. Preferably, the fuel tank is carried by a cradle assembly 44 which is pivotally secured to an upstanding member such as a guard leg 22 and which is disposed at one side of the compartment containing the serviceable component. In accordance with one aspect of the invention the cradle asembly is bridgingly supported and latched in place in a safe manner to another upstanding member disposed at the opposite side of the compartment.

While the invention has been described and shown with particular reference to a preferred embodiment, it will be apparent that variations might be possible that would fall within the scope of the present invention, which is not intended to be limited except as defined in the following claims.

I claim:

1. A pivotal fuel tank mount, for a vehicle having a compartment with a serviceble component therein and an operator protecting frame having a pair of upstanding support legs juxtaposed at either side of the compartment, comprising:
   a fuel tank; a
   a assembly for supporting the fuel tank, the cradle assembly having opposite ends;
   a pivot and support assembly connected to one of the legs of the protecting frame for supporting one end of the cradle assembly; and
   a latching mechanism and support assembly connected to the other one of the legs of the protecting frame for positively holding and supporting the opposite end of the cradle assembly in a normal position bridgingly between the legs, the assemblies being of a construction sufficient for allowing selective swinging movement of the cradle assembly and the fuel tank from the normal position to a service position allowing access to the compartment.

2. The fuel tank mount of claim 1 wherein the pivot and support assembly has a single upstanding mounting pin and the cradle assembly has a bearing member defining a cylindrical opening for receiving the mounting pin and being of a construction for permitting swinging movement of the fuel tank in a generally horizontal plane.

3. The fuel tank mount of claim 2 wherein the latching mechanism and support assembly includes a releasable spring loaded plunger mechanism connected to the other one of the legs which is engageable with the cradle assembly for positively holding it in place and a releasable flexible connector to limit the amount of swinging movement of the cradle assembly from the other one of the legs upon release of the plunger mechanism.

* * * * *